Figure 1:
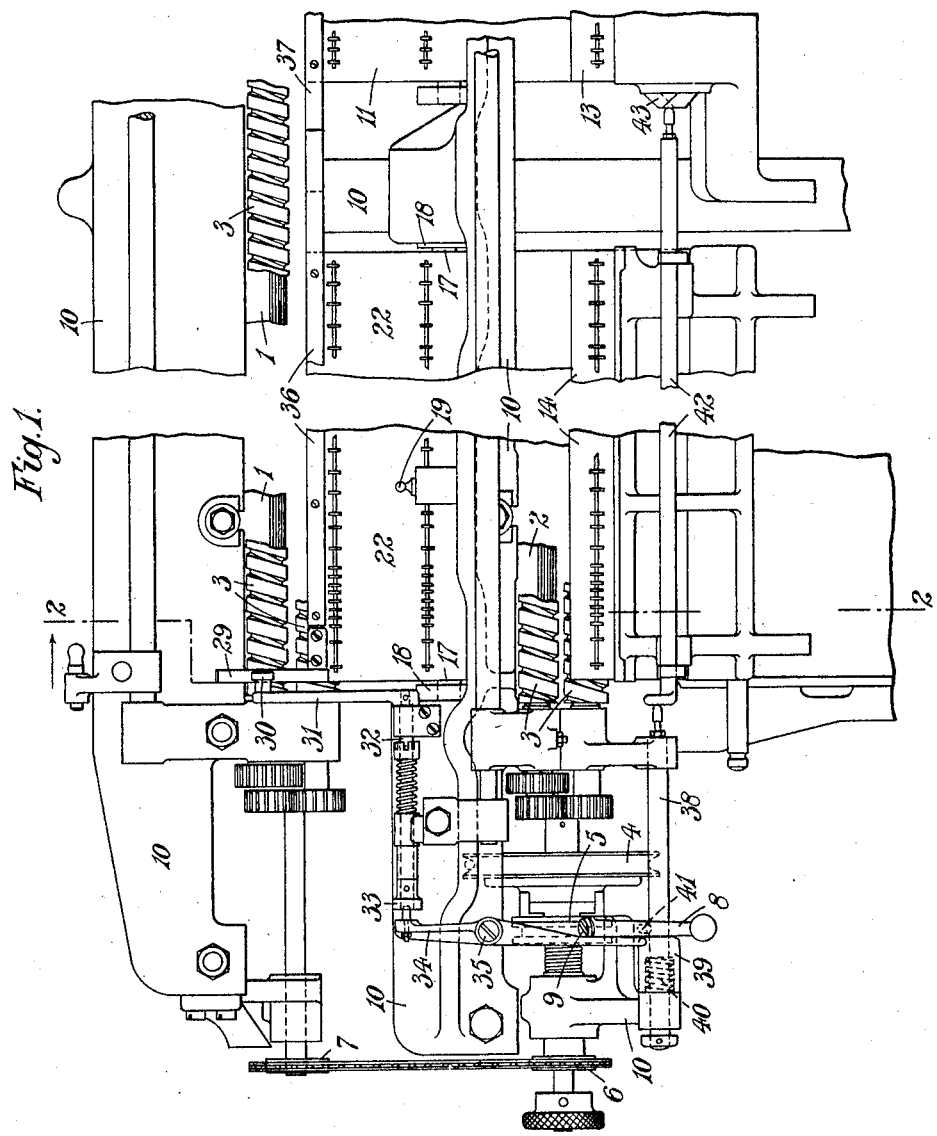

May 29, 1928.  
T. DRAKE  
1,671,150  
DISTRIBUTING MECHANISM OF TYPOGRAPHICAL COMPOSING AND DISTRIBUTING MACHINES  
Filed Dec. 17, 1926  2 Sheets-Sheet 1

Inventor.  
Tom Drake  
By Rogers, Kennedy & Campbell  
Attorneys

May 29, 1928. 1,671,150
T. DRAKE
DISTRIBUTING MECHANISM OF TYPOGRAPHICAL COMPOSING AND DISTRIBUTING MACHINES
Filed Dec. 17, 1926 2 Sheets-Sheet 2

Inventor.
Tom Drake
By Rogers, Kennedy, Campbell
Attorneys

Patented May 29, 1928.

1,671,150

UNITED STATES PATENT OFFICE.

TOM DRAKE, OF ALTRINCHAM, ENGLAND, ASSIGNOR TO LINOTYPE AND MACHINERY LIMITED, OF LONDON, ENGLAND, A BRITISH COMPANY.

DISTRIBUTING MECHANISM OF TYPOGRAPHICAL COMPOSING AND DISTRIBUTING MACHINES.

Application filed December 17, 1926, Serial No. 155,404, and in Great Britain December 29, 1925.

This invention relates to distributing mechanism of typographical composing and distributing machines such as those known commercially under the trade mark "Linotype", and kindred machines, of the kind which are provided with a plurality of fixed distributors, and a plurality of magazines co-operating with such distributors and an assembler entrance.

In machines of this kind employing closely superposed magazines, as heretofore constructed, the distributors have usually been arranged stepwise one above another and the magazine entrances which conduct the matrices from the distributors into the respective magazines have consequently been located one behind another, necessitating the removal of the outer entrances whenever it is desired to have access to the inner entrances.

The object of the present invention is to provide a more compact arrangement of the distributors and magazine entrances and to afford greater facilities for access to the entrances of all the magazines so that one or another of such entrances may be opened without interfering with other entrances. The invention further includes improvements in the form of the magazine entrances themselves and improved connections between such entrances and the distributor clutch mechanism whereby the removal or opening of any one of said entrances effects the disconnection of the distributors from the driving mechanism.

In carrying out the invention the distributors, arranged vertically one above another, deliver matrices into magazine entrances arranged in vertically overlapping relationship so supported that an upper magazine entrance may be moved out of its operative position without disturbing a lower magazine entrance. For this purpose the upper magazine entrances are supported in open bearings from which they can be withdrawn by a pivotal movement followed by a substantially vertical sliding movement, while the lower or lowest magazine entrance is arranged to be opened with the usual pivotal movement, while each of the magazine entrances is connected with the distributor clutch in such a manner that the removal or opening of any one of them throws out the clutch and effects the stoppage of all the distributors.

This invention will be hereinafter described by reference to a constructional form thereof applied to a machine provided with two distributors co-operating with a plurality of main magazines and a plurality of auxiliary magazines arranged at the side of the main magazines.

Figure 2:
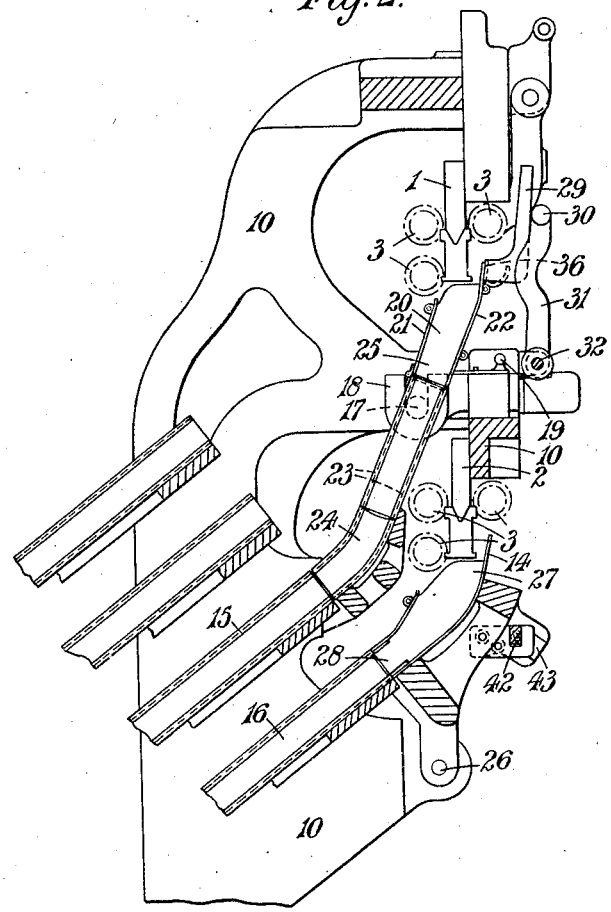

The accompanying drawings show sufficient of the distributing mechanism of such a machine to illustrate the present improvements, Figure 1 being a rear elevation, and Figure 2 is a section on the crooked line 2—2 of Figure 1, looking in the direction of the arrow, with one of the parts located to the left of that line indicated.

Referring to the said drawings, the two fixed distributors, hereinafter referred to as a whole by the reference numerals 1 and 2 respectively, comprise, as usual, distributor bars 1, 2, and conveying screws 3, which latter are continuously rotated from the driving pulley 4 through a clutch 5, sprocket wheels 6, 7, and appropriate gearing. A lever 8, pivoted at 9 to the main frame 10, is provided, by means of which the clutch may be thrown out to arrest the distributing mechanism either by hand or automatically, as hereinafter described. The distributor 1, which is arranged vertically above the distributor 2, serves to deliver matrices to the upper main magazine through the entrance 11 and to the upper auxiliary magazine through the entrance hereinafter referred to as a whole by the reference numeral 22, while the distributor 2 serves to deliver matrices to the lower main and auxiliary magazines through the respective entrances 13 and 14. A distributor box of known form (not shown in the drawings) is provided at the receiving end of each distributor, and matrices which are intended for the lower magazines are prevented, in known manner, from engaging with the upper distributor bar on leaving the upper distributor box. Such matrices fall into a substantially vertical chute through which they are guided into the lower distributor box.

In Figure 2, a column of four auxiliary magazines is indicated, with the lower pair 15, 16, in operative relationship with the two distributor entrances 22, 14, and it will be understood that a plurality of main magazines will be correspondingly arranged to co-operate with the entrances 11, 13 means being provided for adjusting the auxiliary and main magazine columns to bring different pairs thereof into operative position.

In the following description of the magazine entrances, reference is particularly made to those appertaining to the auxiliary magazines, and as the main magazine entrances are of corresponding construction, detail description of the latter will be unnecessary.

In the improved arrangement, the upper magazine entrance 22 is supported by laterally extending studs 17 at each side resting in open forked bearings 18 on the main frame 10, the upper portion of the magazine entrance being retained in its operative position by a latch 19 pivoted to the frame 10. The upper magazine entrance has its upper portion divided into channels by partitions 20 which are rigidly secured at both their top and bottom ends to the front and back plates 21, 22, and in the lower portion the front and back plates are provided with grooves 23 in which the ears of the matrices engage, and which communicate with corresponding channels in a fixed portion 24 by which the matrices are conducted to the magazine.

The before-mentioned grooves in the entrance 22 and portion 24 correspond with the usual grooves in the top and bottom plates of the magazines, so that the matrices are delivered directly into the latter. The partitions 20 are preferably provided with extensions 25 at their lower ends which penetrate into the grooves 23 in the lower portion of the entrance to ensure accurate engagement of the matrix ears with the said grooves.

The lower magazine entrance 14 is pivoted at 26 to the frame 10 and is provided with the usual partitions 27 for conducting the matrices to the lower magazine, preferably provided with extensions 28 which pass into the channels of the lower magazine.

According to the arrangement just described, it will be seen that when access is required to the upper magazine entrance 22, that entrance can be withdrawn from the machine without interfering with the lower magazine entrances 14, after the release of the latch 19, by a pivotal movement of the studs 17 in the bearings 18, followed by a substantially vertical sliding movement to bring the said studs out of the bearings.

In the present arrangement the stoppage of the distributor screws when any one of the magazine entrances is opened or removed is provided for by the mechanism now to be described.

At the rear of the entrance 22 there is provided at one side an arm 29, the outer surface of which constitutes a bearing for a roller 30 on the end of an arm 31 fast to a rockshaft 32 mounted in the frame 10. At its opposite end this shaft carries a face cam 33 with which engages one end of a lever 34 pivoted at 35 in the main frame 10, and the opposite end of which engages with the clutch lever 8. Accordingly, when the entrance is turned backwardly preparatory to raising it out of the open bearing 18, the shaft 32 is rocked and, through the cam 33 and lever 34 the clutch lever 8 is moved to disconnect the distributor drive.

A cross-bar 36 on the rear plate of the entrance 22 extends beyond the edge of that entrance adjacent to the upper main magazine entrance 11, and overlaps a corresponding bar 37 carried by the back plate of said entrance 11, so that on the opening of the latter the engagement of the bar 37 with the bar 36 will effect the opening of the entrance 22 and thereby disconnect the distributor drive as above described.

The throwing out of the distributor clutch on the opening of either of the lower magazine entrances 13, 14, is effected, in known manner, through the agency of a sliding rod 38 having a collar 39 which, when the rod is free to move under the action of a spring 40, contacts with a pin 41 on the clutch lever 8 and throws out the clutch. A bar 42, slidably mounted in guides on the entrance 14, and having normally one end in contact with the inner end of the rod 38 and its opposite end in contact with a cam piece 43 on the magazine entrance 13, serves to compress the spring 40 and keep the collar 39 clear of the pin 41. Hence, when either of the entrances 13 or 14 is moved out of its operative position the rod 38 is moved inwards by its spring and the distributor clutch opened.

Having described my invention, I declare that what I claim and desire to secure by Letters Patent is:—

1. In a typographical composing and distributing machine, the combination of a plurality of fixed distributors arranged vertically one above another, magazine entrances arranged in vertically overlapping relationship for conducting matrices released from the distributors to a corresponding plurality of superposed inclined magazines, pivots on an upper magazine entrance and fixed bearings for said pivots, the pivots being located between the ends of said entrance so that the latter can be rocked into and out of operative position without disturbing a lower magazine entrance.

2. In a typographical composing and distributing machine, the combination of a plurality of fixed distributors arranged vertically one above another, magazine entrances arranged in vertically overlapping relationship for conducting matrices released from the distributors to a corresponding plurality of superposed inclined magazines, pivots on an upper magazine entrance and fixed open bearings for said pivots, the pivots being so located on said entrance that, without disturbing a lower magazine entrance, the upper magazine entrance can be rocked out of operative position and when so rocked removed from the machine by lifting its pivots out of the bearings.

3. In a typographical composing and distributing machine, the combination of a plurality of fixed distributors arranged vertically one above another magazine entrances arranged in vertically overlapping relationship for conducting matrices released from the distributors to a corresponding plurality of superposed inclined magazines, pivots on an upper magazine entrance, fixed bearings for said pivots, the pivots being so located on said entrance that the latter can be rocked into and out of operative position without disturbing a lower magazine entrance, partitions fixed in the upper portion of the upper magazine entrance dividing that entrance into channels for guiding by their flat faces the matrices passing therethrough, and grooves in the lower portion of the same entrance for guiding the said matrices by engaging their edges.

4. In a typographical composing and distributing machine, the combination of a plurality of fixed distributors arranged vertically one above another, magazine entrances arranged in vertically overlapping relationship for conducting matrices released from the distributors to a corresponding plurality of superposed inclined magazines, pivots on an upper magazine entrance, fixed bearings for said pivots, the pivots being so located on said entrance that the latter can be rocked into and out of operative position without disturbing a lower magazine entrance, partitions fixed in the upper portion of the upper magazine entrance dividing that entrance into channels for guiding by their flat faces the matrices passing therethrough, grooves in the lower portion of the same entrance for guiding the said matrices by engaging their edges, and extensions on the partitions engaging with the grooves to ensure engagement between the latter and the matrices.

5. In a typographical composing and distributing machine, the combination of a plurality of fixed distributors arranged vertically one above another, magazine entrances arranged in vertically overlapping relationship for conducting matrices released from the distributors to a corresponding plurality of superposed inclined magazines, pivots on an upper magazine entrance, fixed bearings for said pivots, the pivots being located between the ends of said entrance so that the latter can be rocked into and out of operative position without disturbing a lower magazine entrance, a second plurality of magazine entrances alongside the first plurality and served by the said distributors a clutch in the driving mechanism of the distributors, and means, actuated by the movement out of its operative position of any one of the magazine entrances, to open said clutch.

6. In a typographical composing and distributing machine, the combination of a plurality of magazines arranged in close superposed relation, a corresponding plurality of distributors arranged one above another in more widely spaced relation, and pivotally mounted intermediate magazine entrances for conducting matrices from the distributors to the respective magazines, the pivotal mounting of the upper magazine entrance being located substantially midway between the ends thereof so that it may be swung from its operative position without disturbing the lower distributor or the lower magazine entrance.

7. In a typographical composing and distributing machine, the combination of a plurality of magazines arranged in close superposed relation, a corresponding plurality of distributors arranged one above another in more widely spaced relation, and pivotally mounted intermediate magazine entrances for conducting matrices from the distributors to the respective magazines, the pivotal mounting of the upper magazine entrance being located substantially midway between the ends thereof and comprising open bearings for the pivot studs, whereby the entrance may be swung from its operative position without disturbing the lower distributor or the lower magazine entrance and then lifted bodily out of the machine.

8. A combination according to claim 6 including a distributor-clutch trip-device, and characterized by means operated by the pivotal movement of the upper magazine entrance for actuating said trip-device.

9. A combination according to claim 6 including a duplicate set of magazines, distributors and magazine entrances arranged at the side of the first set, as well as a distributor-clutch trip-device, characterized by means operated by the pivotal movement of the upper magazine entrance of either set for actuating said trip-device.

10. A combination according to claim 6 including a duplicate set of magazines, distributors and magazine entrances arranged at the side of the first set, as well as a distributor-clutch trip-device, characterized by means whereby the pivotal movement of the upper magazine entrance of the second duplicate set will cause a corresponding movement of the upper magazine entrance of the first set, and means operated by the pivotal movement of the latter magazine entrance for actuating the trip-device.

In witness whereof I have affixed my signature hereto.

TOM DRAKE.